United States Patent
Xie et al.

(10) Patent No.: US 10,872,121 B2
(45) Date of Patent: Dec. 22, 2020

(54) SYSTEMS AND METHODS FOR MATCHING USERS

(71) Applicant: Tencent Technology (Shenzhen) Company Limited, Shenzhen (CN)

(72) Inventors: Wenbiao Xie, Shenzhen (CN); Lingming Chen, Shenzhen (CN); Xingping Long, Shenzhen (CN); Xinhai Zeng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 501 days.

(21) Appl. No.: 15/788,667

(22) Filed: Oct. 19, 2017

(65) Prior Publication Data
US 2018/0039712 A1 Feb. 8, 2018

Related U.S. Application Data

(63) Continuation of application No. 14/307,591, filed on Jun. 18, 2014, now abandoned, which is a (Continued)

(30) Foreign Application Priority Data

Jun. 3, 2013 (CN) .......................... 2013 1 0216154

(51) Int. Cl.
*G06F 7/00* (2006.01)
*G06F 16/907* (2019.01)
*G06F 16/9535* (2019.01)

(52) U.S. Cl.
CPC ........ *G06F 16/907* (2019.01); *G06F 16/9535* (2019.01)

(58) Field of Classification Search
None
See application file for complete search history.

(56) References Cited

U.S. PATENT DOCUMENTS

| 5,909,220 A | 6/1999 | Sandow | |
|---|---|---|---|
| 6,052,122 A * | 4/2000 | Sutcliffe | G06Q 30/02 707/999.003 |

(Continued)

FOREIGN PATENT DOCUMENTS

| CN | 1677417 A | 10/2005 |
|---|---|---|
| CN | 1852126 A | 10/2006 |

(Continued)

OTHER PUBLICATIONS

Tencent Technology, ISRWO, PCT/CN2013/089586, dated Mar. 20, 2014.

(Continued)

*Primary Examiner* — Eliyah S. Harper
(74) *Attorney, Agent, or Firm* — Morgan, Lewis & Bockius LLP

(57) ABSTRACT

It is provided a method performed at a server comprising: receiving, from a client, a user matching request corresponding to a second user of the online gaming application; adding the second user to a list of multiple users to be matched, each of the multiple users to be matched being associated with a respective user matching request from a corresponding client playing the online gaming application; generating a predetermined number of user groups from the list of multiple users to be matched, each user group including the second user; calculating one or more first matching degrees for each of the predetermined number of user groups including the second user; selecting, among the predetermined number of user groups, a second user group having a highest first matching degree; and returning information of users in
(Continued)

the second user group to the client sending the user matching request.

18 Claims, 10 Drawing Sheets

Related U.S. Application Data continuation of application No. PCT/CN2013/089586, filed on Dec. 16, 2013.

(56) References Cited

U.S. PATENT DOCUMENTS

| | | | |
|---|---|---|---|
| 6,122,361 A | 9/2000 | Gupta | |
| 7,171,274 B2 | 1/2007 | Starkweather et al. | |
| 8,522,289 B2 | 8/2013 | Athsani et al. | |
| 8,549,061 B2 | 10/2013 | Rao et al. | |
| 9,514,495 B2* | 12/2016 | Erickson | G06Q 50/01 |
| 2002/0059161 A1 | 5/2002 | Li | |
| 2003/0074355 A1* | 4/2003 | Menninger | G06Q 10/06 |
| 2005/0210001 A1 | 9/2005 | Lee | |
| 2005/0278623 A1 | 12/2005 | Dehlinger et al. | |
| 2007/0069901 A1 | 3/2007 | Tuck et al. | |
| 2007/0162507 A1 | 7/2007 | McGovern et al. | |
| 2007/0208751 A1 | 9/2007 | Cowan et al. | |
| 2007/0282621 A1 | 12/2007 | Altman et al. | |
| 2007/0288526 A1* | 12/2007 | Mankad | G06F 11/1662 |
| 2007/0294319 A1* | 12/2007 | Mankad | G06F 11/1662 |
| 2008/0140650 A1* | 6/2008 | Stackpole | H04W 4/029 |
| 2009/0041226 A1 | 2/2009 | Jabbour et al. | |
| 2009/0148124 A1 | 6/2009 | Athsani et al. | |
| 2009/0307003 A1 | 12/2009 | Benyamin et al. | |
| 2010/0016995 A1* | 1/2010 | Barat | G06F 16/217 700/32 |
| 2013/0080467 A1 | 3/2013 | Carson et al. | |
| 2013/0125072 A1 | 5/2013 | Newcomb | |
| 2015/0074109 A1* | 3/2015 | Erickson | G06F 16/285 707/737 |
| 2015/0148094 A1 | 5/2015 | Prociw et al. | |
| 2015/0348119 A1 | 12/2015 | Ferber et al. | |

FOREIGN PATENT DOCUMENTS

| | | |
|---|---|---|
| CN | 102281207 A | 12/2011 |
| CN | 102629945 A | 8/2012 |
| CN | 103294809 A | 9/2013 |

OTHER PUBLICATIONS

Tencent Technology, IPRP, PCT/CN2013/089586, dated Dec. 8, 2015.

Chinese Patent Office, CNOA 201310216154.X, dated Jan. 7, 2016.

Chinese Patent Offcie, CNOA 201310216154.X, dated Jul. 31, 2015.

* cited by examiner

SYSTEMS AND METHODS FOR MATCHING USERS

CROSS REFERENCE TO RELATED APPLICATIONS

This application is a U.S. continuation application of U.S. patent application Ser. No. 14/307,591 filed on Jun. 18, 2014, which is a continuation of International Application No. PCT/CN2013/089586 filed on Dec. 16, 2013, which claims priority to Chinese Patent Application No. 201310216154.X, filed Jun. 3, 2013, all of which are incorporated by reference herein for all purposes.

TECHNICAL FIELD

The disclosure relates to the field of Internet technology, specifically to social network technology, and particularly to method and system for matching users.

BACKGROUND

Certain embodiments of the present invention are directed to computer technology. More particularly, some embodiments of the invention provide systems and methods for data processing. Merely by way of example, some embodiments of the invention have been applied to user matching. But it would be recognized that the invention has a much broader range of applicability.

Currently, the Internet has become an indispensable communication channel in people's daily lives. Through various applications, users can socialize, play games or enjoy entertainment through the Internet. Many applications may involve multiple users. For example, multiple players may need to work together to play a game, and thus a server needs to match different users to provide various Internet services to the users.

Hence it is highly desirable to improve the techniques for user matching.

SUMMARY

According to one embodiment, a method is provided for matching users. For example, a user list that includes multiple users to be matched is maintained; one or more first users are retrieved from the user list; one or more first user groups including the one or more first users are retrieved, the one or more first user groups containing a predetermined number of users from the user list; one or more first matching degrees are calculated for the one or more first user groups; a second user group associated with a highest first matching degree is selected from the one or more first user groups; and the second user group is returned.

According to another embodiment, a user-matching device includes the list-maintenance module, the user-retrieval module, the matching module, the matching-degree-calculation module, the selection module and the return module. The list-maintenance module is configured to maintain a user list that includes multiple users to be matched. The user-retrieval module is configured to retrieve one or more first users from the user list. The matching module is configured to retrieve one or more first user groups including the one or more first users, the one or more first user groups containing a predetermined number of users from the user list. The matching-degree-calculation module is configured to calculate one or more first matching degrees for the one or more first user groups. The selection module is configured to select a second user group associated with a highest first matching degree from the one or more first user groups. The return module is configured to return the second user group.

According to yet another embodiment, a non-transitory computer readable storage medium includes programming instructions for matching users. The programming instructions are configured to cause one or more data processors to execute certain operations. For example, a user list that includes multiple users to be matched is maintained; one or more first users are retrieved from the user list; one or more first user groups including the one or more first users are retrieved, the one or more first user groups containing a predetermined number of users from the user list; one or more first matching degrees are calculated for the one or more first user groups; a second user group associated with a highest first matching degree is selected from the one or more first user groups; and the second user group is returned.

Depending upon embodiment, one or more benefits may be achieved. These benefits and various additional objects, features and advantages of the present invention can be fully appreciated with reference to the detailed description and accompanying drawings that follow.

BRIEF DESCRIPTION OF THE DRAWINGS

In order to illustrate various embodiments or existing technical solutions more clearly, a brief description of drawings that assists the description of embodiments of the invention or existing art will be provided below. It would be apparent that the drawings in the following description are only for some of the embodiments of the invention. A person having ordinary skills in the art will be able to obtain other drawings on the basis of these drawings without paying any creative work.

DETAILED DESCRIPTION OF ILLUSTRATED EMBODIMENTS

Technical solutions in embodiments of the present invention will be illustrated clearly and entirely with the aid of the drawings in the embodiments of the invention. It is apparent that the illustrated embodiments are only some embodiments of the invention instead of all of them. Other embodiments that a person having ordinary skills in the art obtains based on the illustrated embodiments of the invention without paying any creative work should all be within the protection scope sought by the present invention.

Figure 1:
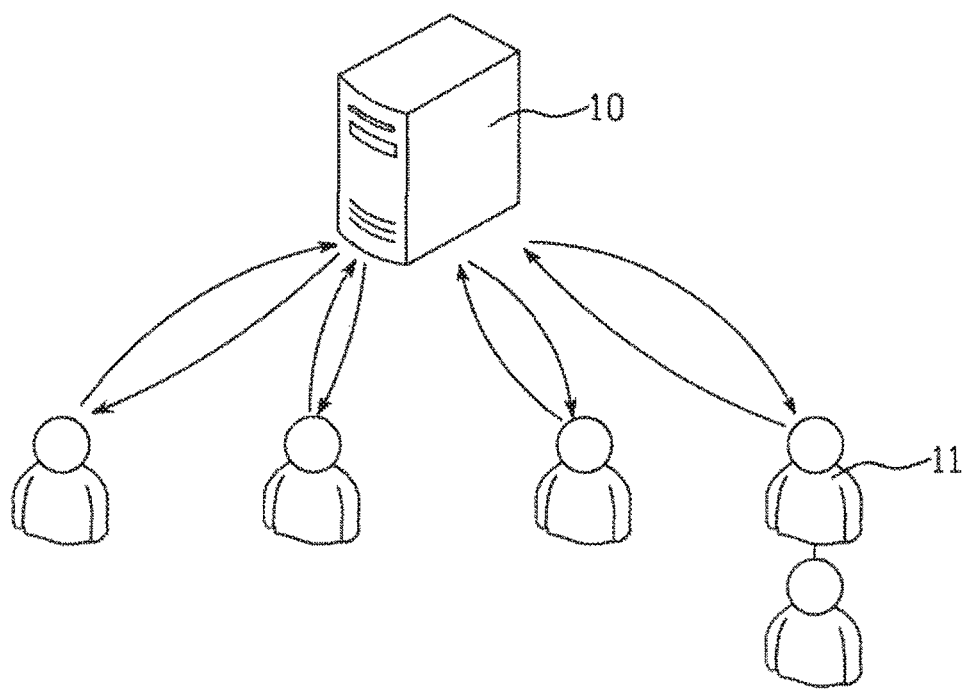
FIG. 1 is a simplified diagram showing an operating environment for user matching according to one embodiment of the present invention.

FIG. 1 is a simplified diagram showing an operating environment for user matching according to one embodiment of the present invention. This diagram is merely an example, which should not unduly limit the scope of the claims. One of ordinary skill in the art would recognize many variations, alternatives, and modifications.

According to one embodiment, as shown in FIG. 1, a user 11 sends a matching request to a server 10 via the Internet. For example, the server 10 accordingly receives the incoming matching request from the user, completes matching users and returns matching results to the user 11. As an example, the user 11 relies on a certain client when sending the matching request. For example, the client includes an electronic device installed and operated with a smart operating system, such as a computer, a laptop, a tablet, a smart phone, a wearable electronic terminal (e.g., a mobile smart watch, glasses, etc.).

Figure 2:
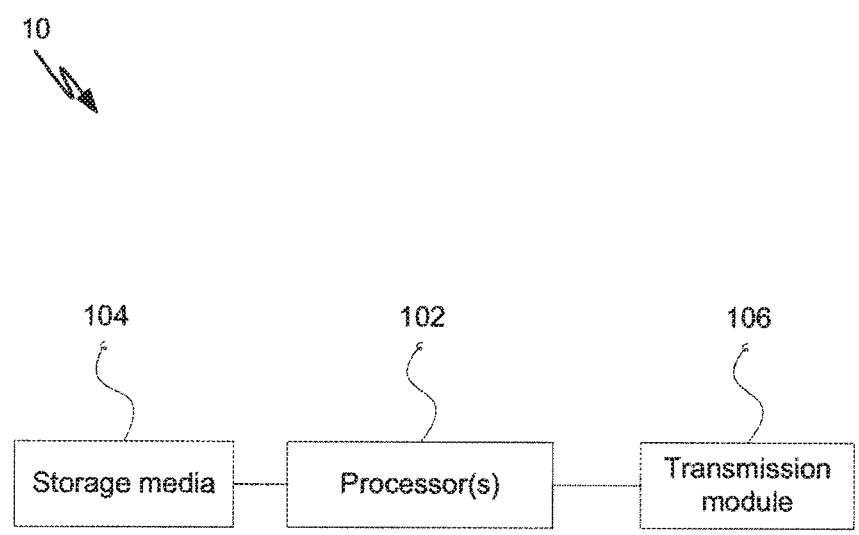
FIG. 2 is a simplified diagram showing a server for user matching according to one embodiment of the present invention.

FIG. 2 is a simplified diagram showing the server 10 for user matching according to one embodiment of the present invention. This diagram is merely an example, which should not unduly limit the scope of the claims. One of ordinary skill in the art would recognize many variations, alternatives, and modifications. The server 10 includes one or more processors 102, one or more storage media 104 and a transmission module 106.

According to one embodiment, the storage media 104 is configured to store software programs and modules, such as program instructions/modules that correspond to a user-matching method and a user-matching device described in the present disclosure. For example, the processors 102 execute various functional applications and data processing through the software programs and modules stored in the storage media 104 to realize the user-matching method and the user-matching device. As an example, the storage media 104 includes high-speed random access memory devices, as well as non-volatile memory devices such as one or more magnetic storage devices, flash memory or other non-volatile, solid state memory devices. In some embodiments, the storage media 104 further include remote memory devices relative to the processors 102, and these remote memory devices can be connected to the server 10 via a network (e.g., the Internet, a company intranet, a local area network or a mobile communication network, or other suitable networks).

According to another embodiment, the transmission module 106 is configured to receive or send data through a network (e.g., a wired network, or a wireless network). For example, the transmission module 106 includes a Network Interface Controller (NIC) that can be connected to other network devices or routers using a network cable to communicate with the Internet. In another example, the transmission module 106 includes a Radio Frequency (RF) module configured to communicate with clients wirelessly.

Figure 3:
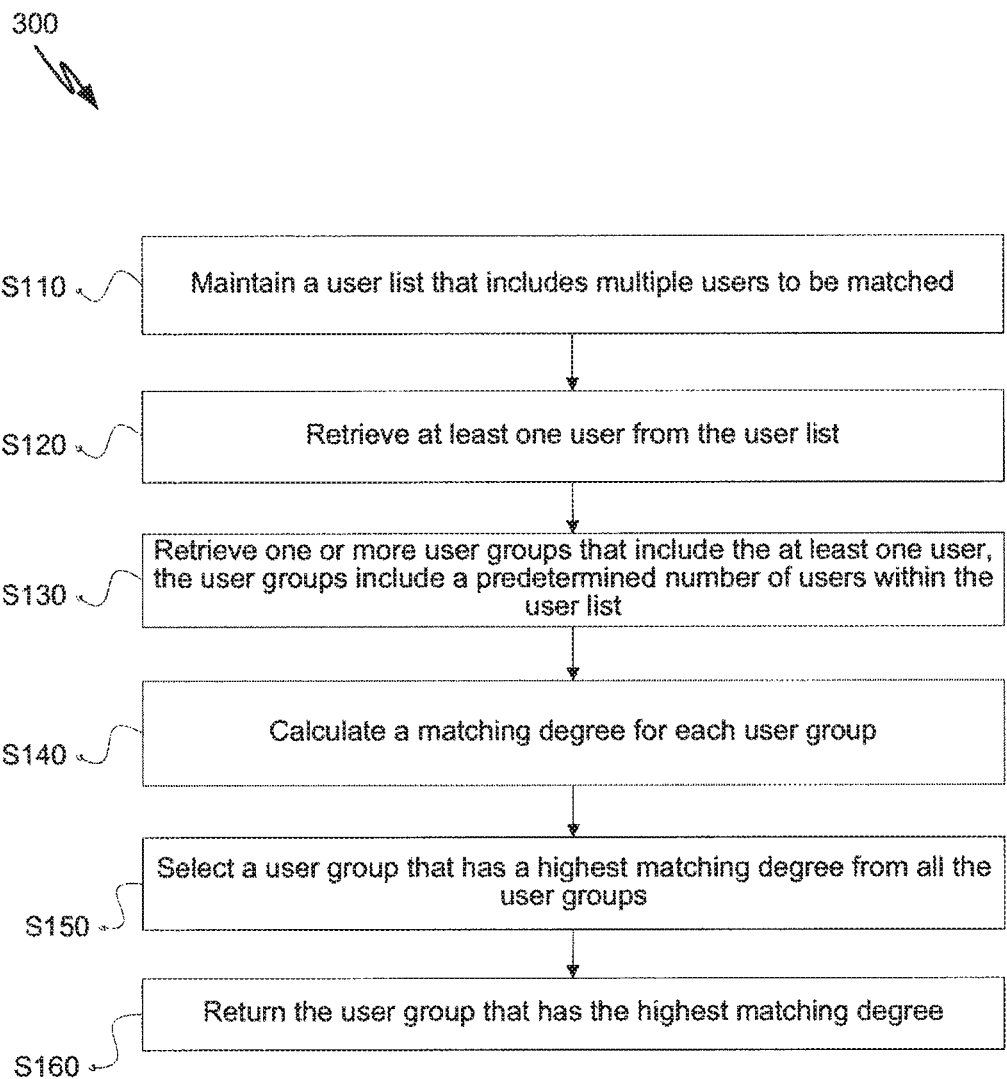
FIG. 3 is a simplified diagram showing a method for user matching according to one embodiment of the present invention.

FIG. 3 is a simplified diagram showing a method for user matching according to one embodiment of the present invention. This diagram is merely an example, which should not unduly limit the scope of the claims. One of ordinary skill in the art would recognize many variations, alternatives, and modifications. The method 300 includes at least the process S110-S160.

According to one embodiment, the process S110 includes: maintaining a user list that includes multiple users to be matched. As shown in FIG. 1, different users send matching requests to the server 10 respectively, in some embodiments. For example, the server 10 receives the incoming matching requests from the users through the transmission module 106. As an example, a matching request corresponds to at least one user. In another example, each matching request corresponds to only one user. In yet another example, each matching request corresponds to two or more users. For example, a particular user invites his/her good friends to form a team and then sends a matching request to the server 10. In this case, the matching request corresponds to two or more users. Upon receipt of the matching request, the server 10 can then parse and identify the corresponding users and add every user to the user list, in certain embodiments. For example, the user list has a certain logical order. As an example, the user list is arranged in accordance with submission times of certain matching requests. The logical sequencing is different from a storage structure and a storage order of the user list, in some embodiments.

According to another embodiment, the process S120 includes: retrieving at least one user from the user list. For example, at least one user corresponding to an earliest submission time of a matching request is retrieved from the user list. In some embodiments, the user list is ordered based on at least information associated with user priority. For example, some important users can have a higher priority and be given preference for user matching. As an example, the retrieved at least one user here can be one user. In another example, multiple users correspond to a matching request, and the retrieved at least one user may include all users associated with the matching request, so that all users of the matching request are matched into a user group.

According to yet another embodiment, the process S130 includes: retrieving one or more user groups that include the at least one user. For example, the user groups include a predetermined number of users within the user list. As an example, the user list includes M users, and the retrieved at least one user includes A users. The predetermined number of users correspond to K users. For example, the process Step S130 includes: retrieving all possible sub-groups (e.g., K-A) from the user list except the at least one user (e.g., M-A). As an example, the number of such possible sub-groups is $C_{M-A}^{K-A}$. All user groups can be obtained by combining these sub-groups with the retrieved at least one user, in some embodiments. For example, the process S130 includes: retrieving from M users all possible groups including K users. The number of such user groups is $C_M^K$, and then the user groups that include the retrieved at least one user are retrieved.

In another embodiment, the process S140 includes: calculating a matching degree for each user group. For example, the matching degree is calculated based on at least information associated with one or more characteristic requests of a user. As an example, a user group matching the user's characteristic requests has a high matching degree. In another example, the matching degree is represented by one or more indices. The higher the index, the higher the matching degree. As an example, calculating a matching degree of a user group including N users with respect to a particular characteristic request includes: obtaining all possible two-user sub-groups among all users within the user group; calculating a matching value M for each sub-group. For example, if a sub-group matches with the characteristic value corresponding to the characteristic request, M is a predetermined non-zero value. Otherwise, M is zero. In another example, calculating a matching degree of a user group including N users with respect to a particular characteristic request includes: calculating the characteristic matching degree based on the following formula:

$$\frac{\sum_1^{C_N^2} M}{C_N^2}$$

In yet another example, the characteristic request is included in the matching request. For example, a user interface is provided on a client to record certain characteristics desired by a user, such as user role, level, gender, geographical location, etc.

In yet another embodiment, during the process S110, if a matching request is received from a first user, one or more second users corresponding to the matching request are added to the user list. Furthermore, one or more characteristic values are set for the newly added second users. As an example, the characteristic values are obtained from a database. In another example, the method 300 includes: setting one or more characteristic values for each user in the user list.

In some embodiments, in a matching request, a user requires other users or virtual roles operated by other users have certain characteristics: 1. level matching; 2. complementary roles; 3. geographical proximity (same city). For example, with respect to each characteristic, if two users are matched, the matching degree of that particular characteristic is 100. In another example, in a user group, the average value of the matching degree of all the two-user sub-groups is recorded as the matching degree of that particular characteristic. In yet another example, the level matching refers to at a same level or with a same level range. As an example, the level range can be 1-5, 6-10, 11-15, etc. The smaller the level difference, the higher the matching degree. For example, the complementary roles refer to different roles. The more the roles complement each other, the higher the matching degree. As another example, with respect to the geographical location, the closer the two users are, the higher the matching degree. If two users are located in a same city, a highest matching degree (e.g., 100) is given, in some embodiments.

According to one embodiment, a user group includes the following three users: User A: Level 10, role of master, geographical location in Shenzhen; User B: Level 8, role of master, geographical location in Guangzhou; User C: Level 12, role of master, geographical location in Shenzhen. For example, with respect to level matching, A and B match with each other, A and. C do not match, and. B and C do not match. Hence, the matching degree=(100+0+0)/3=33.3. In another example, with respect to roles, A, B and C do not match with each other, and thus the matching degree=0. In yet another example, with respect to geographical locations, A and C match with each other, while A and B half-match with each other and B and C half-match with each other (e.g., users in a same region are considered to be half-match). Hence, the matching degree=(100+50+50)/3=66.7.

In some embodiments, the importance of each characteristic is different, and the specific importance may be set according to specific needs. For example, for a matching request that includes several characteristic requests, the calculation of the matching degree of a user group includes: retrieving one or more characteristic requests of a user; setting one or more weighting factors for each characteristic request; calculating one or more characteristic matching degrees based on at least information associated with the one or more characteristic requests; and calculating a matching degree for the user group based on at least information associated with the weighting factors and the first characteristic matching degrees. In another example, level matching has a highest priority, role matching has a second highest priority, and geographical location matching has a lowest priority. The weighting factors of the three characteristics are 60, 30 and 10 respectively. As an example, the overall matching degree=level*0.6+role*0.3+geographical location*0.1=33.3*0.6+0*0.3+66.7*0.1=26.65.

According to yet another embodiment, the process S150 includes: selecting a user group that has a highest matching degree from all the user groups. For example, after the matching degrees of all user groups have been calculated, the matching degrees are arranged in order and the user group with the highest matching degree is then selected. In another example, the process S160 includes: returning the user group that has the highest matching degree. In yet another example, returning the user group that has the highest matching degree refers to: for every user in the user group, return the information of all other users, and the information of other users can be displayed at a side of the user. In yet another example, the information of other users includes attribute information of other users such as role names, levels, role types, geographical locations, etc. The user-matching method 300 can be implemented to obtain quickly user-matching results that meet user expectations to allow smooth operations of various online applications, in some embodiments.

Figure 4:
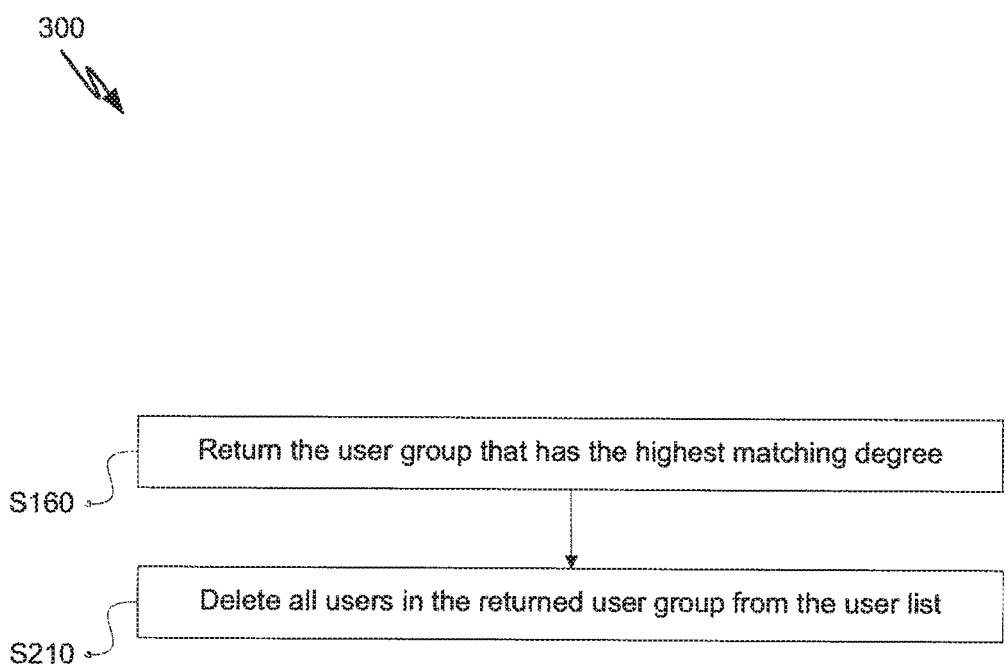
FIG. 4 is a simplified diagram showing a method for user matching according to another embodiment of the present invention.

FIG. 4 is a simplified diagram showing the method 300 for user matching according to another embodiment of the present invention. This diagram is merely an example, which should not unduly limit the scope of the claims. One of ordinary skill in the art would recognize many variations, alternatives, and modifications. In addition to the processes S110-S160, the method 300 further includes at least the process S210. According to one embodiment, after the process S160, the process S210 is executed and includes: deleting all users in the returned user group from the user list. Thus, a same user will not be matched to two different user groups at the same time, in some embodiments.

Figure 5:
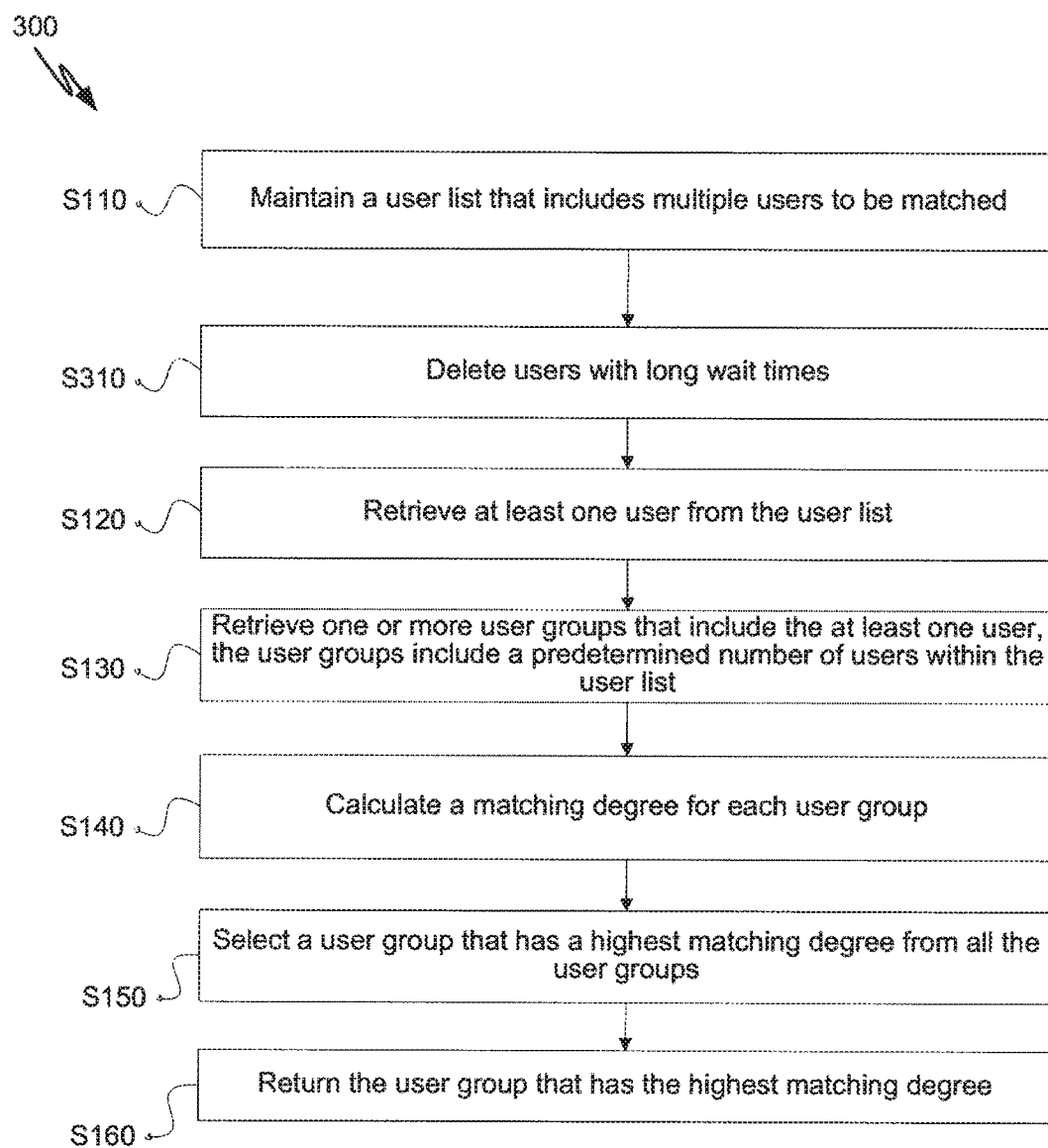
FIG. 5 is a simplified diagram showing a method for user matching according to yet another embodiment of the present invention.

FIG. 5 is a simplified diagram showing the method 300 for user matching according to yet another embodiment of the present invention. This diagram is merely an example, which should not unduly limit the scope of the claims. One of ordinary skill in the art would recognize many variations, alternatives, and modifications. In addition to the processes S110-S160, the method 300 further includes at least the process S310. According to one embodiment, the process S310 is executed between the process S110 and the process S120 and includes: determining whether a wait time associated with a matching request related to a user in the user list exceeds a threshold based on at least information associated with a submission time of the matching request; in response to the wait time exceeding the threshold, returning a matching-failure message for the user and deleting the user from the user list.

Figure 6:
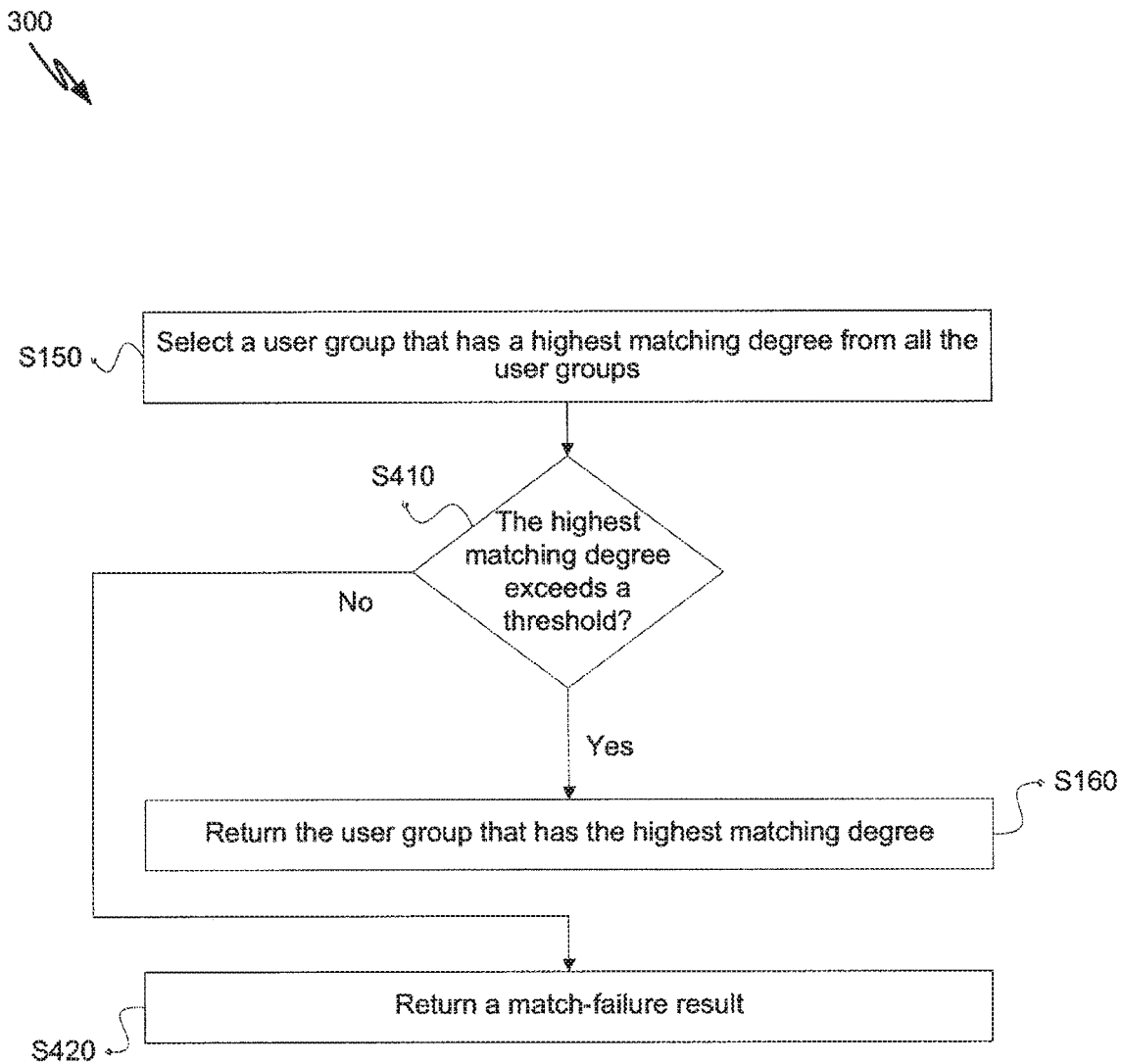
FIG. 6 is a simplified diagram showing a method for user matching according to yet another embodiment of the present invention.

FIG. 6 is a simplified diagram showing the method 300 for user matching according to yet another embodiment of the present invention. This diagram is merely an example, which should not unduly limit the scope of the claims. One of ordinary skill in the art would recognize many variations, alternatives, and modifications. In addition to the processes S110-S160, the method 300 further includes at least the processes S410 and S420.

According to one embodiment, the process S410 is executed between the process S150 and the process S160, and includes: determine if a matching degree of a user group with a highest matching degree has exceeded a predetermined threshold. For example, if the highest matching degree exceeds the predetermined threshold, the process S160 is executed. Otherwise, the process S420 is executed and a match-failure result is returned. The match-failure result is returned only when the matching degree of the user group with the highest matching degree exceeds the predetermined threshold, so as to ensure that the matched user generally falls within an expected range, in some embodiments.

Figure 7:
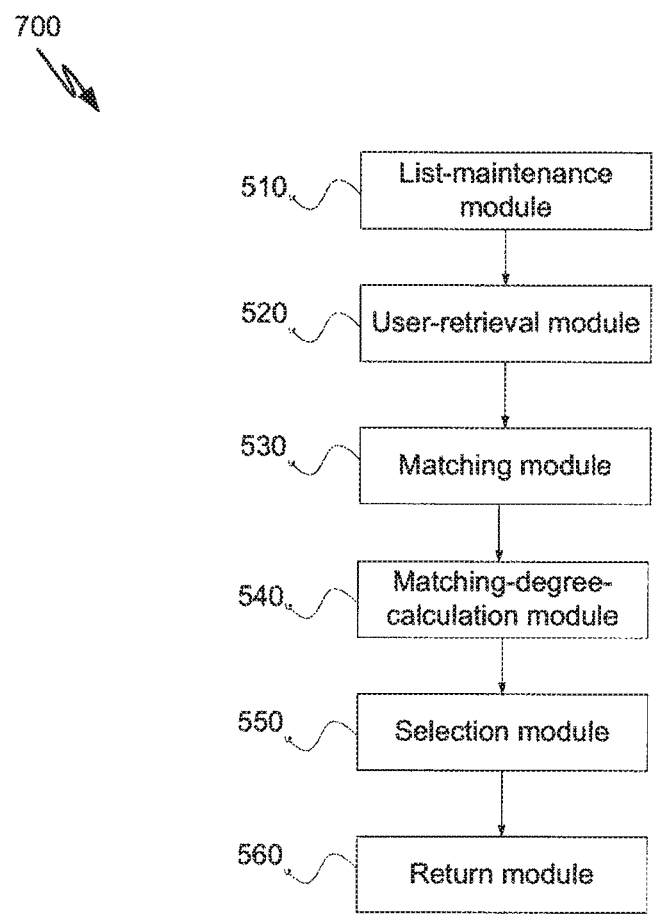
FIG. 7 is a simplified diagram showing a device for user matching according to one embodiment of the present invention.

FIG. 7 is a simplified diagram showing a device for user matching according to one embodiment of the present invention. This diagram is merely an example, which should not unduly limit the scope of the claims. One of ordinary skill in the art would recognize many variations, alternatives, and modifications. The device 700 includes a list-maintenance module 510, a user-retrieval module 520, a matching module 530, a matching-degree-calculation module 540, a selection module 550 and a return module 560.

According to one embodiment, a list-maintenance module 510 is configured to maintain a user list that includes multiple users to be matched. As shown in FIG. 1, different users send matching requests to the server 10 respectively, in some embodiments. For example, the server 10 receives the incoming matching requests from the users through the transmission module 106. As an example, a matching request corresponds to at least one user. In another example, each matching request corresponds to only one user. In yet another example, each matching request corresponds to two or more users. For example, a particular user invites his/her good friends to form a team and then sends a matching request to the server 10. In this case, the matching request corresponds to two or more users. Upon receipt of the matching request, the server 10 can then parse and identify the corresponding users and add every user to the user list, in certain embodiments. As an example, the list-maintenance module 510 is further configured to set characteristic values for each user in the user list. The characteristic values refer, for example, to information such as level, gender and geographical location of a user or a virtual character operated by a user. For example, the user list has a certain logical order. As an example, the user list is arranged in accordance with submission times of certain matching requests. The logical sequencing is different from a storage structure and a storage order of the user list, in some embodiments.

According to another embodiment, the user-retrieval module 520 is configured to retrieve at least one user from the user list. For example, at least one user corresponding to an earliest submission time of a matching request is retrieved from the user list. In some embodiments, the user list is ordered based on at least information associated with user priority. For example, some important users can have a higher priority and be given preference for user matching. As an example, the retrieved at least one user here can be one user. In another example, multiple users correspond to a matching request, and the retrieved at least one user may include all users associated with the matching request, so that all users of the matching request are matched into a user group.

According to yet another embodiment, a matching module 530 is configured to retrieve all user groups that include the retrieved at least one user. For example, the user groups include a predetermined number of users within the user list. In another example, the matching-degree-calculation module 540 is configured to calculate a matching degree for each user group. For example, the matching degree is calculated based on at least information associated with one or more characteristic requests of a user. As an example, a user group matching the user's characteristic requests has a high matching degree. In another example, the matching degree is represented by one or more indices. The higher the index, the higher the matching degree. As an example, calculating a matching degree of a user group including N users with respect to a particular characteristic request includes: obtaining all possible two-user sub-groups among all users within the user group; calculating a matching value M for each sub-group. For example, if a sub-group matches with the characteristic value corresponding to the characteristic request, M is a predetermined non-zero value. Otherwise, M is zero. In another example, calculating a matching degree of a user group including N users with respect to a particular characteristic request includes: calculating the characteristic matching degree based on the following formula:

$$\frac{\sum_{1}^{C_N^2} M}{C_N^2}$$

In yet another example, the characteristic request is included in the matching request. For example, a user interface is provided on a client to record certain characteristics desired by a user, such as user role, level, gender, geographical location, etc.

In some embodiments, the importance of each characteristic is different, and the specific importance may be set according to specific needs. For example, for a matching request that includes several characteristic requests, the calculation of the matching degree of a user group includes: retrieving one or more characteristic requests of a user; setting one or more weighting factors for each characteristic request; calculating one or more characteristic matching degrees based on at least information associated with the one or more characteristic requests; and calculating a matching degree for the user group based on at least information associated with the weighting factors and the first characteristic matching degrees.

In certain embodiments, the selection module 550 is configured to select a user group with a highest matching degree from all the user groups. For example, after the matching degree of all user groups have been calculated, the matching degrees are arranged in order and the user group that has the highest matching degree is then selected. In another example, the return module 560 is configured to return the user group that has the highest matching degree. In yet another example, returning the user group that has the highest matching degree refers to: for every user in the user group, return the information of all other users, and the information of other users can be displayed at a side of the user. In yet another example, the information of other users includes attribute information of other users such as role names, levels, role types, geographical locations, etc.

Figure 8:
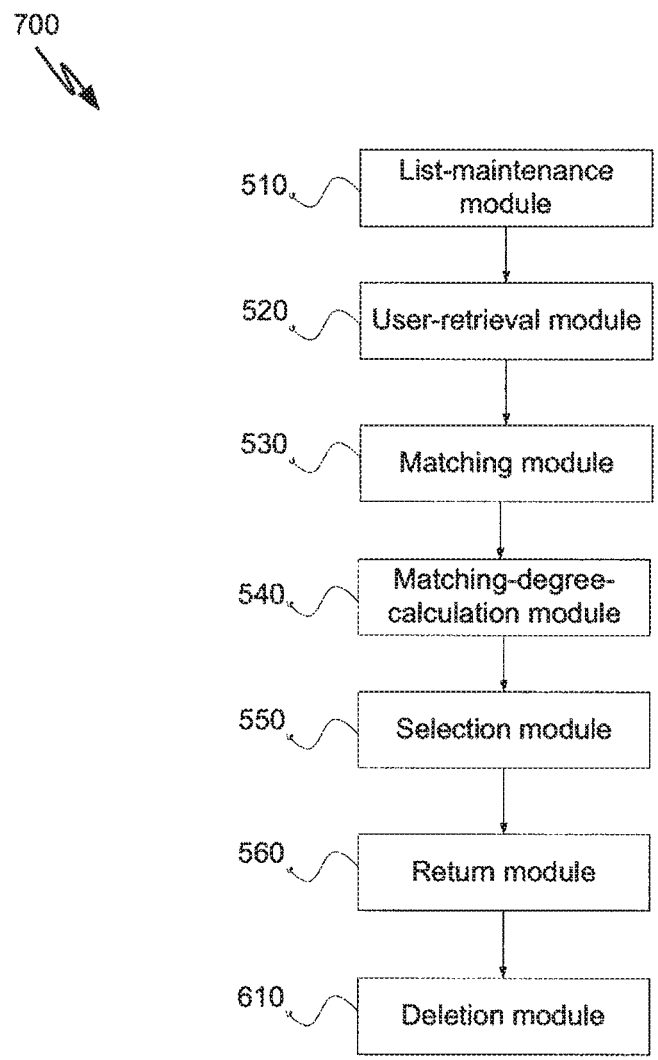
FIG. 8 is a simplified diagram showing a device for user matching according to another embodiment of the present invention.

FIG. 8 is a simplified diagram showing the device 700 for user matching according to another embodiment of the present invention. This diagram is merely an example, which should not unduly limit the scope of the claims. One of ordinary skill in the art would recognize many variations, alternatives, and modifications. For example, in addition to the modules 510-560, the device 700 further includes a deletion module 610 configured to delete all users in a returned user group from the user list. Thus, a same user will not be matched to two different user groups at the same time, in some embodiments.

Figure 9:
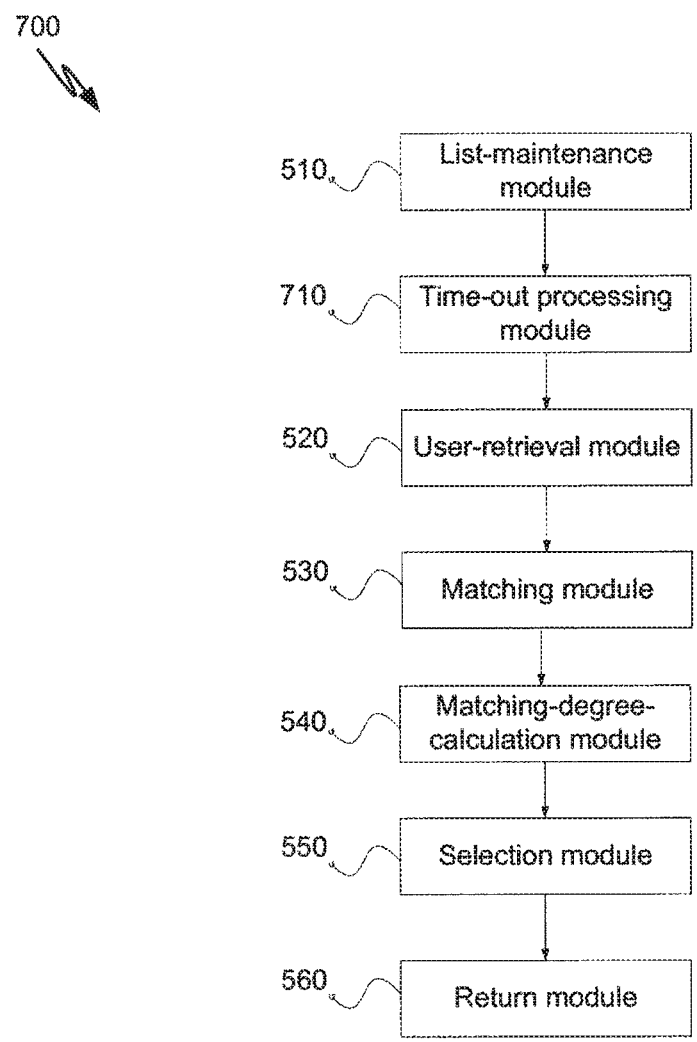
FIG. 9 is a simplified diagram showing a device for user matching according to yet another embodiment of the present invention.

FIG. 9 is a simplified diagram showing the device 700 for user matching according to yet another embodiment of the present invention. This diagram is merely an example, which should not unduly limit the scope of the claims. One of ordinary skill in the art would recognize many variations, alternatives, and modifications. For example, in addition to the modules 510-560, the device 700 further includes a timeout-processing module 710 configured to: determine whether a wait time associated with a matching request related to a user in the user list exceeds a threshold based on at least information associated with a submission time of the matching request; in response to the wait time exceeding the threshold, return a matching-failure message for the user and delete the user from the user list.

Figure 10:
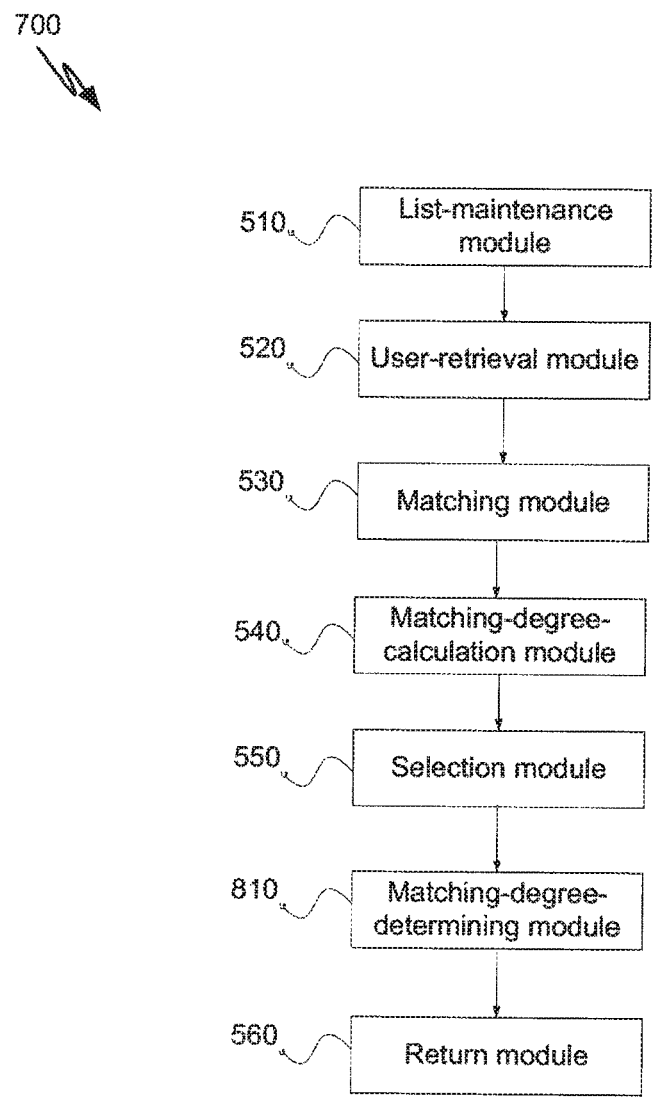
FIG. 10 is a simplified diagram showing a device for user matching according to yet another embodiment of the present invention.

FIG. 10 is a simplified diagram showing the device 700 for user matching according to yet another embodiment of the present invention. This diagram is merely an example, which should not unduly limit the scope of the claims. One of ordinary skill in the art would recognize many variations, alternatives, and modifications.

According to certain embodiments, in addition to the modules 510-560, the device 700 further includes a matching-degree-determining module 810 configured to determine if a matching degree of a user group with a highest matching degree has exceeded a predetermined threshold. For example, the return module 560 is further configured to, in response to the highest matching degree exceeding the predetermined threshold, return the user group with the highest matching degree, and in response to the highest matching degree not exceeding the predetermined threshold, return a matching failure result. The match-failure result is returned only when the matching degree of the user group with the highest matching degree exceeds the predetermined threshold, so as to ensure that the matched user generally falls within an expected range, in some embodiments.

According to one embodiment, a method is provided for matching users. For example, a user list that includes multiple users to be matched is maintained; one or more first users are retrieved from the user list; one or more first user groups including the one or more first users are retrieved, the one or more first user groups containing a predetermined number of users from the user list; one or more first matching degrees are calculated for the one or more first user groups; a second user group associated with a highest first matching degree is selected from the one or more first user groups; and the second user group is returned. For example, the method is implemented according to at least FIG. 3, FIG. 4, FIG. 5, and/or FIG. 6.

According to another embodiment, a user-matching device includes the list-maintenance module, the user-retrieval module, the matching module, the matching-degree-calculation module, the selection module and the return module. The list-maintenance module is configured to maintain a user list that includes multiple users to be matched. The user-retrieval module is configured to retrieve one or more first users from the user list. The matching module is configured to retrieve one or more first user groups including the one or more first users, the one or more first user groups containing a predetermined number of users from the user list. The matching-degree-calculation module is configured to calculate one or more first matching degrees for the one or more first user groups. The selection module is configured to select a second user group associated with a highest first matching degree from the one or more first user groups. The return module is configured to return the second user group. For example, the device is implemented according to at least FIG. 7, FIG. 8, FIG. 9, and/or FIG. 10.

According to yet another embodiment, a non-transitory computer readable storage medium includes programming instructions for matching users. The programming instructions are configured to cause one or more data processors to execute certain operations. For example, a user list that includes multiple users to be matched is maintained; one or more first users are retrieved from the user list; one or more first user groups including the one or more first users are retrieved, the one or more first user groups containing a predetermined number of users from the user list; one or more first matching degrees are calculated for the one or more first user groups; a second user group associated with a highest first matching degree is selected from the one or more first user groups; and the second user group is returned. For example, the storage medium is implemented according to at least FIG. 3, FIG. 4, FIG. 5, and/or FIG. 6.

The above only describes several scenarios presented by this invention, and the description is relatively specific and detailed, yet it cannot therefore be understood as limiting the scope of this invention's patent. It should be noted that ordinary technicians in the field may also, without deviating from the invention's conceptual premises, make a number of variations and modifications, which are all within the scope of this invention. As a result, in terms of protection, the patent claims shall prevail.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

While this specification contains many specifics, these should not be construed as limitations on the scope or of what may be claimed, but rather as descriptions of features specific to particular embodiments. Certain features that are described in this specification in the context or separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed:

1. A method for selecting a group of users for an online gaming application performed at a server having one or more processors and memory storing a plurality of programs to be executed by the one or more processors, the method comprising:
   receiving, from a client device, a user matching request corresponding to a second user of the online gaming application, the user matching request indicating a level of the second user playing the online gaming application;
   adding the second user to a list of multiple users to be matched, each of the multiple users to be matched being associated with a respective user matching request from a corresponding client playing the online gaming application;
   generating a predetermined number of user groups from the list of multiple users to be matched, each user group including the second user;
   calculating one or more first matching degrees for each of the predetermined number of user groups including the second user according to a corresponding level matching degree between the level of the second user and a level of another user in a same user group playing the online gaming application;
   selecting, among the predetermined number of user groups, a second user group having a highest first matching degree associated with the levels of users in the second user group;
   returning information of users in the second user group to the client device, wherein the second user joins with the other users in the second user group for playing the online gaming application together; and
   deleting all the users in the second user group including the second user from the list of multiple users to be matched after returning information of users in the second user group to the client.

2. The method of claim 1, wherein the user matching request includes one or more characteristics, each characteristic corresponding to an attribute of the second user associated with the online gaming application and the attribute having a corresponding characteristic value defined by the online gaming application.

3. The method of claim 2, wherein the one or more characteristics include level matching between two users of the online gaming application, role matching between the two users of the online gaming application, and geographical matching between the two users of the online gaming application.

4. The method of claim 2, wherein calculating one or more first matching degrees for each of the predetermined number of user groups including the second user includes:
   for each of the predetermined number of user groups:
      selecting each unique pair of users from the user group;
      determining a characteristic matching degree for each of the one or more characteristics based on a comparison of the characteristic values of the two users in the unique pair;
      calculating a first matching degree for the user group based on a weighted sum of the characteristic matching degrees between the users in user group, wherein each characteristic matching degree has a respective weighting factor defined by the online gaming application.

5. The method of claim 1, wherein the list of multiple users to be matched is sorted based on at least information associated with one or more submission times related to their respective user matching requests.

6. The method of claim 1, further comprising:
   determining whether a wait time associated with the user matching request exceeds a threshold based on at least information associated with a submission time of the user matching request;
   in response to the wait time exceeding the threshold, returning a matching-failure message for the second user to the client; and
   deleting the second user from the list of multiple users to be matched.

7. A server for selecting a group of users for an online gaming application, comprising:
   one or more processors;
   memory; and
   a plurality of programs stored in the memory that, when executed by the one or more processors, cause the server to perform a plurality of operations including:
      receiving, from a client device, a user matching request corresponding to a second user of the online gaming application, the user matching request indicating a level of the second user playing the online gaming application;
      adding the second user to a list of multiple users to be matched, each of the multiple users to be matched being associated with a respective user matching request from a corresponding client playing the online gaming application;
      generating a predetermined number of user groups from the list of multiple users to be matched, each user group including the second user;
      calculating one or more first matching degrees for each of the predetermined number of user groups including the second user according to a corresponding level matching degree between the level of the second user and a level of another user in a same user group playing the online gaming application;
      selecting, among the predetermined number of user groups, a second user group having a highest first matching degree associated with the levels of users in the second user group;
      returning information of users in the second user group to the client device, wherein the second user joins with the other users in the second user group for playing the online gaming application together; and
      deleting all the users in the second user group including the second user from the list of multiple users to be matched after returning information of users in the second user group to the client.

8. The server of claim 7, wherein the user matching request includes one or more characteristics, each characteristic corresponding to an attribute of the second user associated with the online gaming application and the attribute having a corresponding characteristic value defined by the online gaming application.

9. The server of claim 8, wherein the one or more characteristics include level matching between two users of the online gaming application, role matching between the two users of the online gaming application, and geographical matching between the two users of the online gaming application.

10. The server of claim 8, wherein the operation of calculating one or more first matching degrees for each of the predetermined number of user groups including the second user further includes:
    for each of the predetermined number of user groups:
       selecting each unique pair of users from the user group;
       determining a characteristic matching degree for each of the one or more characteristics based on a comparison of the characteristic values of the two users in the unique pair;
       calculating a first matching degree for the user group based on a weighted sum of the characteristic matching degrees between the users in user group, wherein each characteristic matching degree has a respective weighting factor defined by the online gaming application.

11. The server of claim 7, wherein the list of multiple users to be matched is sorted based on at least information associated with one or more submission times related to their respective user matching requests.

12. The server of claim 7, wherein the plurality of operations further include:
    determining whether a wait time associated with the user matching request exceeds a threshold based on at least information associated with a submission time of the user matching request;
    in response to the wait time exceeding the threshold, returning a matching-failure message for the second user to the client; and
    deleting the second user from the list of multiple users to be matched.

13. A non-transitory computer readable storage medium comprising programming instructions for selecting a group of users for an online gaming application, the programming instructions configured to cause one or more processors of a server to execute a plurality of operations comprising:
    receiving, from a client device, a user matching request corresponding to a second user of the online gaming application, the user matching request indicating a level of the second user playing the online gaming application;
    adding the second user to a list of multiple users to be matched, each of the multiple users to be matched being associated with a respective user matching request from a corresponding client playing the online gaming application;
    generating a predetermined number of user groups from the list of multiple users to be matched, each user group including the second user;
    calculating one or more first matching degrees for each of the predetermined number of user groups including the second user according to a corresponding level matching degree between the level of the second user and a level of another user in a same user group playing the online gaming application;
    selecting, among the predetermined number of user groups, a second user group having a highest first matching degree associated with the levels of users in the second user group;
    returning information of users in the second user group to the client device, wherein the second user joins with the other users in the second user group for playing the online gaming application together; and
    deleting all the users in the second user group including the second user from the list of multiple users to be matched after returning information of users in the second user group to the client.

14. The non-transitory computer readable storage medium of claim 13, wherein the user matching request includes one or more characteristics, each characteristic corresponding to an attribute of the second user associated with the online gaming application and the attribute having a corresponding characteristic value defined by the online gaming application.

15. The non-transitory computer readable storage medium of claim 14, wherein the one or more characteristics include level matching between two users of the online gaming application, role matching between the two users of the online gaming application, and geographical matching between the two users of the online gaming application.

16. The non-transitory computer readable storage medium of claim 14, wherein the operation of calculating one or more first matching degrees for each of the predetermined number of user groups including the second user further includes:
for each of the predetermined number of user groups:
selecting each unique pair of users from the user group;
determining a characteristic matching degree for each of the one or more characteristics based on a comparison of the characteristic values of the two users in the unique pair;
calculating a first matching degree for the user group based on a weighted sum of the characteristic matching degrees between the users in user group, wherein each characteristic matching degree has a respective weighting factor defined by the online gaming application.

17. The non-transitory computer readable storage medium of claim 13, wherein the list of multiple users to be matched is sorted based on at least information associated with one or more submission times related to their respective user matching requests.

18. The non-transitory computer readable storage medium of claim 13, wherein the plurality of operations further include:
determining whether a wait time associated with the user matching request exceeds a threshold based on at least information associated with a submission time of the user matching request;
in response to the wait time exceeding the threshold, returning a matching-failure message for the second user to the client; and
deleting the second user from the list of multiple users to be matched.

* * * * *